(12) United States Patent
Chastain, Jr. et al.

(10) Patent No.: US 10,017,092 B1
(45) Date of Patent: Jul. 10, 2018

(54) ADJUSTABLE TRUCKBED WITH EXTENDABLE RAMP

(71) Applicants: Robert M Chastain, Jr., Hampton, GA (US); Robert M Chastain, Sr., Hampton, GA (US)

(72) Inventors: Robert M Chastain, Jr., Hampton, GA (US); Robert M Chastain, Sr., Hampton, GA (US)

( * ) Notice: Subject to any disclaimer, the term of this patent is extended or adjusted under 35 U.S.C. 154(b) by 0 days.

(21) Appl. No.: 15/687,515

(22) Filed: Aug. 27, 2017

(51) Int. Cl.
*B60P 1/43* (2006.01)
*B62D 33/027* (2006.01)

(52) U.S. Cl.
CPC .............. *B60P 1/431* (2013.01); *B60P 1/433* (2013.01); *B60P 1/435* (2013.01); *B62D 33/0273* (2013.01)

(58) Field of Classification Search
CPC ....... B62D 33/0273; B60P 1/431; B60P 1/433
USPC .......................................................... 296/62
See application file for complete search history.

(56) References Cited

U.S. PATENT DOCUMENTS

| | | | | |
|---|---|---|---|---|
| 4,601,632 A | * | 7/1986 | Agee | B60P 1/431 14/71.1 |
| 5,257,894 A | | 11/1993 | Grant | |
| 5,468,114 A | | 11/1995 | Hickerson | |
| 5,597,195 A | | 1/1997 | Meek | |
| 6,042,923 A | * | 3/2000 | Lewis | B60P 1/433 14/71.1 |
| 6,059,344 A | * | 5/2000 | Radosevich | B60P 1/43 296/61 |
| 6,705,820 B2 | | 3/2004 | Schilling | |
| 7,309,202 B1 | | 12/2007 | Anderson | |
| 7,488,025 B1 | * | 2/2009 | Roberson | B60P 1/433 296/61 |
| 7,524,156 B2 | | 4/2009 | Garbes | |
| 7,549,692 B2 | | 6/2009 | Washington | |
| 7,810,196 B1 | | 10/2010 | Pritchard et al. | |
| 7,976,264 B1 | | 7/2011 | Pope | |
| 9,073,475 B2 | * | 7/2015 | Chastain, Jr. | B60P 1/435 |
| 2004/0009055 A1 | | 1/2004 | Scherle | |
| 2004/0219004 A1 | | 11/2004 | Huggins | |
| 2004/0223836 A1 | | 11/2004 | Robertson | |
| 2004/0226116 A1 | * | 11/2004 | O'Donnell | B60P 1/431 14/69.5 |
| 2006/0245883 A1 | | 11/2006 | Fontaine | |
| 2007/0237614 A1 | * | 10/2007 | Johnson | B60P 1/431 414/467 |
| 2008/0159838 A1 | | 7/2008 | Sherer | |
| 2010/0266378 A1 | | 10/2010 | Verwys | |

(Continued)

*Primary Examiner* — Jason S Morrow
(74) *Attorney, Agent, or Firm* — J.T. Hollin, Attorney at Law, P.C.

(57) ABSTRACT

Disclosed is an adjustable-length, variable-tracked ramp loading system attachable to the bed of a pickup truck, utility truck, or a stationary loading dock. The ramp loading system serves to assist with the loading of assorted types of cargo, including wheeled vehicles, construction equipment, supplies, materials, and other objects of dimensions compatible with the size of the truck bed or dock. The system is constructed and operates with a minimum of two extendable ramps. Each ramp is horizontally stowed or nestled within an individual bridge, which bridge is further housed inside a bedrunner. Each bedrunner is attached to the bed/floor of the truck or loading dock. The ramps may be extended and angularly lowered at varying distances from the rear of the truck bed or dock.

14 Claims, 5 Drawing Sheets

(56) References Cited

U.S. PATENT DOCUMENTS

| | | | |
|---|---|---|---|
| 2011/0072596 A1 | 3/2011 | Kenny | |
| 2013/0294873 A1* | 11/2013 | Chastain, Jr. | B60P 1/435 |
| | | | 414/523 |
| 2014/0356117 A1* | 12/2014 | Barger | G01N 23/04 |
| | | | 414/523 |
| 2016/0059763 A1* | 3/2016 | Sindoni, Jr. | B60P 1/431 |
| | | | 414/537 |
| 2017/0174113 A1* | 6/2017 | Garrison | B60P 1/433 |
| 2017/0267150 A1* | 9/2017 | Bergen | B60P 1/431 |

\* cited by examiner

ADJUSTABLE TRUCKBED WITH EXTENDABLE RAMP

REFERENCE TO RELATED APPLICATION

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the invention

The inventive concept presented herein is generally concerned with devices and methods for operating an efficient, extendable loading ramp with sufficient strength and durability to on-load and off load objects, particularly wheeled equipment and vehicles.

Several varying mechanisms and systems have been marketed over the years. Ramps have been designed to be carried within the cargo area of a truck and deployed at the time of loading or unloading cargo. Most of these ramps take up valuable cargo space and usually must be secured with heavy-duty straps or other restraints. This may take considerable time to store and/or deploy such ramps. It is not compact nor is it convenient and easy to extend or assemble quickly.

Some solutions utilize a tailgate with a ramp that is troublesome, overly-large, or difficult to install and operate and usually requires removal of the factory-equipped tailgate. The inventive concept herein provides a safe, inexpensive, strong, simple to operate, extendable ramp system that can be securely installed in a compact space occupying no more than four inches vertically above the truck's bed.

(2) Description of the Related Art

The following documents present general concepts related to the inventive concept herein.

U.S. Pat. No. 9,073,475 (Jul. 7, 2015) (Chastain, R.) Disclosed is an adjustable-length, variable-tracked ramp loading system attachable to a stationary loading dock or to the bed of any of a variety of trucks, said ramp loading system functioning to assist with the loading of assorted types of cargo including mowing equipment, wheeled vehicles, construction equipment, supplies, materials, and other objects of dimensions compatible with the size of the ramps which comprise the ramp loading system installed. The system is constructed and operates with a minimum of two (2) extendable ramps, each ramp reinforced with four lengthwise I-beams. Each ramp is manually pulled out from its individual bridge, which bridge itself is stored inside horizontally-oriented primarily longitudinal housing channels attached to the bed of the thick or loading dock. The ramps may be extended and angularly lowered at varying distances from the rear of the truck bed or dock.

U.S. Pat. No. 8,991,894 (Mar. 31, 2015) (Smith, et al) A configurable pickup bed utility management system features a segmented panel assembly pivotally mounted to a pickup bed. The panel assembly features a first panel, a second panel pivotally located on the first panel, a third panel pivotally located on the second panel, and a fourth panel pivotally located on the third panel. A plurality of curved linear extrusions with ridges are located on the panels. The panel assembly can be fully extended over the pickup bed forming a bed cover structure, fully extended posterior to the pickup bed forming a work surface structure, fully extended posterior to the pickup bed forming a ramp structure, partially extended posterior to the pickup bed forming a sun shade structure, folded into the pickup bed forming a lockable toolbox, or folded into the pickup bed forming a bed extender.

U.S. Pat. No. 8,827,343) (Peters, D.) The tailgate storage case assembly is made of an elongated hollow storage compartment having a closed front end and an open rear end. A pivot bracket is mounted to the storage compartment near the front end for supporting the front end to the sidewall of a pickup truck box. The pivot bracket has a pivot joint therein for allowing an angular displacement of the hollow storage compartment about the pivot joint. The storage case assembly also includes a latch bracket mounted to the storage compartment near the rear end thereof for supporting the rear end to the sidewall. The latch bracket has a slide surface thereon for allowing the rear end of the hollow storage compartment to be displaced toward and away from the sidewall to define a clearance between a ramp being stowed in the storage case assembly and the tailgate post of the pickup truck.

US 2011/0072596 (Kenny, M.) Disclosed is a system extending a ramp from a storage position on a vehicle tailgate or flatbed. The device has a collection box channel with a sliding member slidingly engaged and moving within the collection box channel and coupling an end of the ramp to the collection box, the sliding member being coupled to the end of ramp closest to the collection box when the ramp is extended. Two support hinge members couple the two folding support members, where the two folding support members extend, unfold, and pivot on the two support hinge members and straighten and the extension member extends on the control element to extend the ramp.

U.S. Pat. No. 7,976,264 B1 (Jul. 12, 2011; Pope, T.) A truck bed platform apparatus is provided as replacement or original equipment. An access below the platform selectively houses the individually rollingly removable ramps. Bi-directional hinges which fasten each ramp second section to each first section are lockable, giving the ramps infinite incline and decline capabilities. Bi-directional lockable hinges affix each third section to each second section for the same reason. Varied lengths of the hinged legs also provide selective angle and support for each ramp.

US 2010/0266378 A1 (Oct. 21, 2010; Verwys, P.) The invention is a device that may be mounted on a bed of a pickup truck for smaller vehicles, such as motorcycles, snowmobiles, or all-terrain vehicles to enter from the ground upon a platform of the loading device. The loading device has a ramp that can be pulled outwardly or rearwardly form said device, and a motorcycle can drive up the ramp to the platform. A dolly slide is polled outwardly from the device, and extends above the tailgate. The ramp then extends downwardly from the dolly slide, so that no weight or load is displaced on the tailgate.

U.S. Pat. No. 7,810,196 B1 (Oct. 12, 2010; Pritchard et al.) The invention as presently conceived discloses a variable length system attachable to a standard pickup truck that assists with the loading of all-terrain vehicles and similar items. The length of each ramp can vary independently with the other from four feet to a maximum of eight feet. The extension is similar to that of an extension ladder in which one piece slides inside the other. A textile strap with connectors provides further securement of the ramps with the truck body. When not in use, the ramps can be collapsed and stored in minimal space.

U.S. Pat. No. 7,549,692 B2 (Jun. 23, 2009; Washington, D.) A compact ramp and tailgate system for a vehicle tailgate includes a tailgate having an interior hollow cavity for collapsible storage therein of a pair of ramps that are also telescopically extendable therefrom for loading and unloading equipment into and off the bed of the vehicle such as a pickup truck. E each ramp is mounted to a locking hinge that allows the ramps to pivot up to ninety degrees and each ramp composed of at least three ramp members of decreasing size starting from the largest ramp members that are pivotally interconnected to the locking hinges.

U.S. Pat. No. 7,524,156 B2 (Apr. 28, 2009; Garbes, L.) Disclosed is a portable ramp and tool container for use in the bed of a pickup truck where the container includes interchangeable retractable and extendable ramps and tool trays which pull out from the container. Portions of the ramps can pivot downward to contact the ground while the tool tray may have a leg attached for support.

US 2008/0159838 A1 (Jul. 3, 2008; Sherer, B.) The invention is a three-section foldable loading ramp extending a pick-up truck's cargo area to accommodate heavy and lengthy items. The first, or frame section of the loading ramp installs onto the existing tailgate slip hinges in place of the tailgate without tools or modification of the vehicle. Upper and lower ramp sections are pivotally connected to each other and to the frame section in a similar manner. An arm carried by the first frame section pivots down onto the vehicle's hitch for additional support for the ramp. Two legs pivot down from the upper ramp to the ground, providing further support.

U.S. Pat. No. 7,309,202 B1 (Dec. 18, 2007: Anderson, M.) A system for transporting and storing a portable combination table/ramp device in a truck, including a substantially flat platform supported by a plurality of support members positioned between the platform and the truck bed and defining a plurality of elongated recesses there between. Elongated table top portion and elongated bench seat portions with tailgate-engaging portions connected thereto are received in the recesses.

US 2006/0245883 A1 (Nov. 2, 2006; Fontaine et al.) A ramp assembly for use in a vehicle provides access thereto by users having restricted mobility. The ramp assembly comprises a ramp platform displaceable relative to a mounting structure between a retracted position and a deployed position. A drive mechanism is disposed within the mounting structure and operates to displace the ramp platform between the retracted and the deployed positions.

US 2004/0009055 A1 (Jan. 15, 2004; Scherle, J.) Shows a tilting ramp is for mounting to a truck, and once so mounted, for loading, unloading and transport of at least one personal recreational vehicle. The ramp is slidable over the bed of the truck. A pivot member is mounted into a receiver tube mounted to the truck. The pivot member extends upwardly into translational engagement with the ramp. The ramp may be translated over both the bed and the pivot member between a transport position forward on the bed and a pivoting position pivotable about the pivot member. In the pivoting position the ramp is pivotable between the horizontal and an inclined position contacting the ground.

U.S. Pat. No. 6,705,820 B2 (Mar. 16, 2004) (Schilling, H.) A carrier/lift adapted to be mounted in a truck bed, and having a carrying platform that pivots and translates in a constrained manner along a pair of tracks to an inclined loading position for safe and convenient loading of the vehicle into the bed of a truck. A platform having a recess for storage of a pair of nestable loading ramps is also disclosed. The platform can be supported above the floor of a truck bed to provide usable storage space in the bed of the truck between the platform (with the nested ramps stowed therein) and the floor of the truck bed.

US 2004/0223836 A1 (Nov. 11, 2004; Robertson, R.) A vehicle ramp assembly for loading ATVs and like things onto transporting vehicles. The ramp assembly includes a pair of ramps positioned side-by-side. Each of the ramps has an upper end for engagement with a transporting vehicle and a lower end for positioning upon the ground. At least one crosspiece connects the ramps together between the upper and lower ends thereof. The crosspiece is releasably fastened to one of the ramps and is pivotally fastened to the other one of the ramps for compact storage.

US 2004/0219004 A1 (Nov. 4, 2004; Huggins, G.) A pickup truck tailgate and loading ramp is formed by a main frame dimensioned to be hingedly received by a given pickup bed. Two pairs of hingedly interconnected frames are rigidly secured to the top rail of the tailgate section and form a pair of ramp tracks when in tailgate lowered position. When not in use the track forming frames are disposed rearwardly of the closed tailgate section.

U.S. Pat. No. 5,597,195 (Jan. 28, 1997; Meek, K.) This invention is a tailgate comprising a plurality of foldable members configured to nest one with the others in an upright closed position and to extend longitudinally from the rear of the truck when in an extended position. A notched section is positioned at a top side of the plurality of foldable members when in an upright position for accommodating a goose neck trailer.

U.S. Pat. No. 5,468,1995 (Nov. 21, 1995; Hickerson, S.) A loading device to be fixedly secured to the bed of a pick-up truck for loading and unloading vehicles into and from the bed thereof. Included is a pair of transversely spaced parallel slideways within a rectangular metal frame and a pair of pivotally connected, in tandem, rigid ramp sections. The forward one of said ramp sections being slidably mounted within said slideways and the more rearward one being swingable to a vertical position and connectable thereat to the conventional latching mechanism at the rear end of the side walls of a pick-up truck.

U.S. Pat. No. 5,257,894 (Nov. 2, 1993; Grant, H) Disclosed is a stowable loading ramp assembly for small vehicles, such as pickup trucks, vans and trailer, which includes a stowing chamber and an extendable loading ramp. The assembly is installable in a truck bed, or the like, with the stowed loading ramp access positioned toward the rear or tail gate of the vehicle. The loading ramp is locked in the stowed position by a floating locking plate, which is raised to permit the loading ramp to be withdrawn from the stowing chamber.

BRIEF SUMMARY OF THE INVENTIVE CONCEPT

The inventive concept herein discloses a ramp loading system 1 which, in the preferred embodiment, is permanently attached to the bed of a pickup truck, trailer truck, or other utility type truck. The disclosures herein essentially comprise an interconnected mechanism having at least one pivotable ramp, which is telescopically stored within a "bridge" component and, in turn, the bridge is housed within a corresponding "bed runner" unit. The preferred embodiment of the ramp loading system comprises four parallel segments or mechanisms, each mechanism consisting of an arrangement of its own bedrunner, bridge, and ramp. Thus, each mechanism of the disclosed ramp loading system 1 is comprised of three components. However, some embodiments of this inventive concept may comprise as few as two or three parallel segments/mechanisms.

The largest of the three components are the bedrunners, which essentially is an oblong, rectangular cross-sectioned hollow box. The bedrunners, in the case of a pickup truck, may be of a length equal to that of the truck bed on which it is installed. However, the length of the bedrunners is such as to allow the complete closure of the tailgate of the truck, if so equipped. In the "nestled" configuration, each bedrunner contains both its corresponding bridge and ramp. The ramp loading system 1 may also be installed on a loading dock, wharf, or other permanent structure.

The second component of the ramp loading system 1 is the bridge, each of which comprises a hollow, rectangular cross-sectioned shaft, optimally four feet in length. With multiple bridges installed, they are functionally arranged side-by-side, across the width of a pickup truck, in one embodiment. Each bridge is of an exterior contour of height and width dimensions slightly smaller than that of its corresponding bedrunner. This provides for a precisely-fitted enclosure of the bridges within the inner dimensions of the larger bedrunner component. Each bridge is constructed so as to allow stowage of the bridge within the front section of its associated bedrunner. The bridge is restricted from complete separation from the bedrunner.

The third component of the ramp loading system 1 is the ramp, comprised of a cross-sectional structure resembling that of an I-beam. Each ramp comprises left and right overhanging flanges along its length. The cross-sectional profile of each ramp is of width and height dimension less than the inner cross-sectional profile of its corresponding bridge. The ramp is constructed with a pull-handle at its front end, to accommodate pulling out and extending the ramp. However, care is taken to leave a continuous clearance along the length of the ramp relative to its bridge enclosure. The space between the flanges allows passage of the four I-beams of the ramp through the sub-bridges.

Sequential deployment of the ramp loading system 1 begins with (1) opening of the tailgate of the truck, (2) grasping the exposed handle at the front end of at least one ramp, (3) pulling the ramp horizontally outward (which simultaneously places the bridge(s) in sliding motion within the bedrunner); (4) continuing the outward pull of the ramp and bridge until the bridge is fully extended at a travel limit set by a bridge stop nut within the bedrunner; (5) physically sensing that a ramp hinge pin engages stop blocks at the front interior of the bridge, thereby limiting further travel of the ramp; and (6) lowering the handle end of the ramp until it contacts the ground or other surface.

The ramp loading system 1 disclosed can be included attached to a vehicle as a standard manufacturer's option or a vehicle may be retrofitted with the ramp loading system as an accessory. The ramp loading system 1 minimizes strenuous lifting, improves safety, saves space on a truck bed or dock, and is simple to operate.

BRIEF DESCRIPTION OF THE VIEWS OF DRAWINGS AS EXEMPLARY EMBODIMENTS OF THE INVENTIVE CONCEPT

The objects, features, and advantages of the concept presented in this application are more readily understood when referring to the accompanying drawings. The drawings, totaling thirteen figures, show the basic functions of the preferred embodiment of the inventive concept. In the several figures, like reference numbers are used in each figure to correspond to the same component as may be depicted in other figures.

| Nomenclature For Invention Components | |
|---|---|
| 1. | Ramp loading system |
| 2. | Truck bed |
| 3. | Truck Sidewall |
| 4. | Truck back wall |
| 5. | Tailgate |
| 6. | Pickup truck |
| 7(a) | First bedrunner |
| 7(b) | Second bedrunner |
| 7(c) | Third bedrunner |
| 7(d) | Fourth bedrunner |
| 8(a) | First bridge |
| 8(b) | Second bridge |
| 8(c) | Third bridge |
| 8(d) | Fourth bridge |
| 9(a) | First ramp |
| 9(b) | Second ramp |
| 9(c) | Third ramp |
| 9(d) | Fourth ramp |
| 10.-11. | n/a |
| 12. | Left stop block |
| 13. | Right stop block |
| 14. | Ramp left wall |
| 15. | Ramp right wall |
| 16. | Ramp top surface |
| 17. | Ramp left flange |

-continued

Nomenclature For Invention Components

| | |
|---|---|
| 18. | Ramp right flange |
| 19. | Ramp bottom surface |
| 20. | Handle |
| 21. | Recessed opening |
| 22.-23. | n/a |
| 24. | Hinge pivot bar |
| 25. | Travel rod |
| 26. | Rod threads |
| 27. | Rod guide tube |
| 28. | Guide tube cap |
| 29. | Bridge stop nut |
| 30.-32. | n/a |
| 33. | Bridge upper surface |
| 34. | Bridge lower surface |
| 35. | n/a |
| 36. | Weld |
| 37.-49. | n/a |
| 50. | Ramp stabilizer |
| 51. | Truck stabilizer |
| 52. | Surface or ground |
| 53.-57. | n/a |
| 58. | Bedrunner top surface |
| 59. | Bedrunner undersurface |
| 60. | Bedrunner front end |
| 61. | Bedrunner back end |
| 62. | Bridge front end |
| 63. | Bridge back end |
| 70. | Ramp front end |
| 71. | Ramp back end |
| 72. | n/a |
| 73. | Suport beam |
| 74. | I-beam bracket |
| 75. | Bolt |
| 76. | n/a |

DETAILED DESCRIPTION OF INVENTIVE

Figure 1:
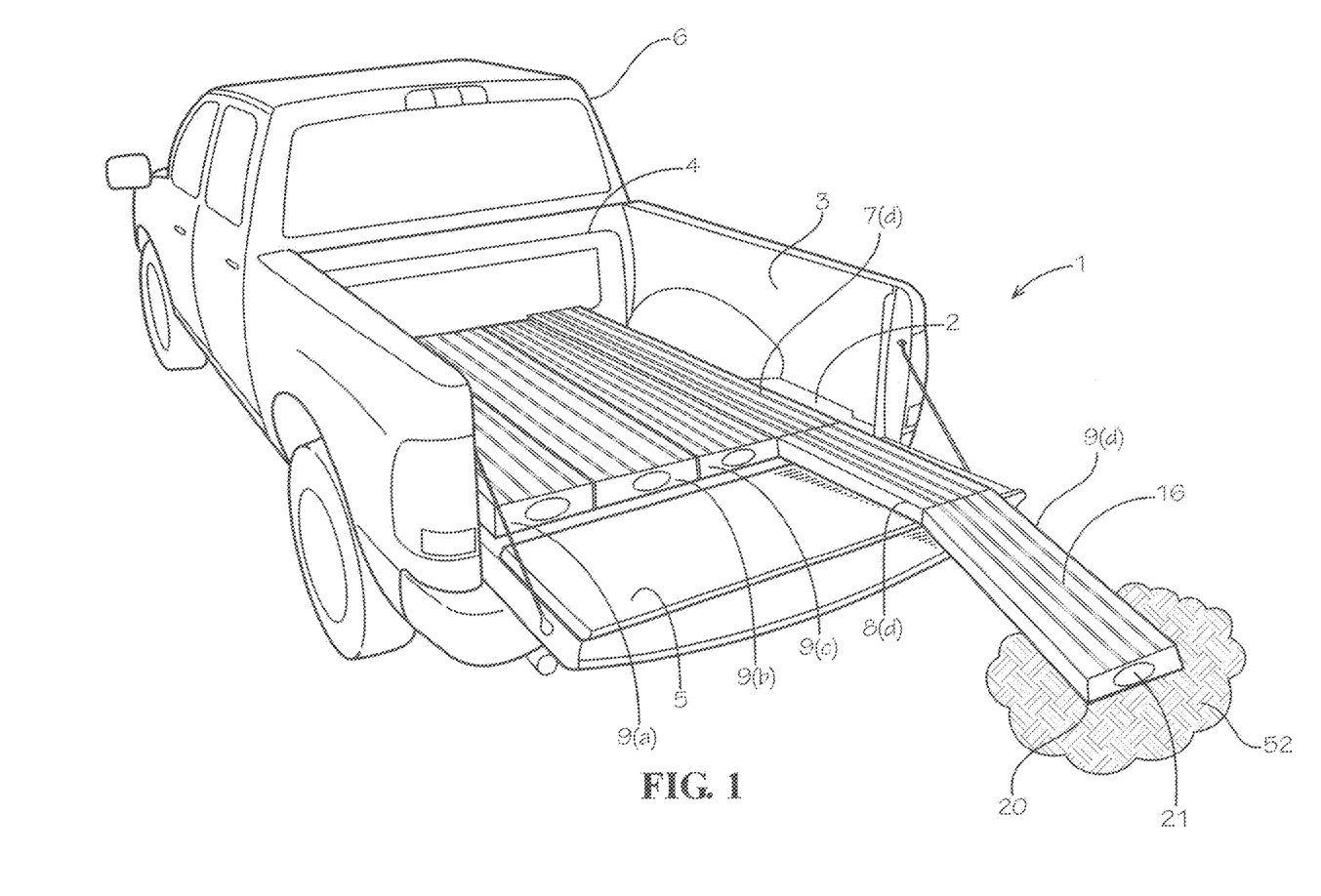
FIG. 1 illustrates a typical pickup truck having a ramp loading system 1 installed onto the bed 2 of the truck and further, one bridge 8(*d*) and one ramp 9(*d*) extended.

Beginning with FIG. 1, there is shown the rear of a typical pickup truck 6 with a ramp loading system 1 installed in its bed 2. FIG. 1 depicts the preferred embodiment of the ramp loading system 1, having four lengthwise sections. Visible are four housing sections, termed "bedrunners" 9(a), 9(b), 9(c), and 9(d). Each bedrunner 9(a)-9(d) encompasses a bridge, and each bridge encompasses a ramp. The rightmost section of the displayed ramp loading system 1 depicts a bed runner 7(d), a bridge 8(d) and a fully deployed ramp 9(d). The ramp 9(d) shown, has been deployed to make contact with the ground 52 or other surface upon which the truck 6 is parked. A portion of the deployed ramp 9(d) previously had been stored within its associated bridge 8(d), and the bridge 8(d) in turn had been tally nestled within the bedrunner 7(d).

To accomplish the deployment of the ramp 9(a) shown in FIG. 1, a user had to grasp the handle 20 by its recessed opening 21 and pull horizontally outward. The outward pulling action continued until a hinge pivot bar 24 (shown in FIG. 2) at the hinge end of the ramp 9(d) engaged two stop blocks 12, 13 within the bridge 8(d). The pulling action therefore moved the ramp 9(d) lengthwise to sequentially cause the bridge 8(d) to begin its extension from the associated bedrunner 7(d).

Figure 8:
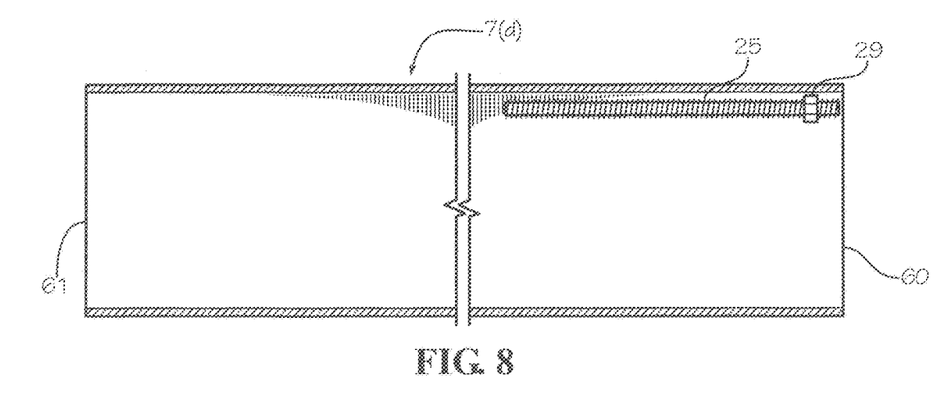
FIG. 8 illustrates a "peel-away" plan view of one of the bedrunners 7(*d*), further showing the internal travel rod 25.

Upon the bridge 8(d) reaching its full withdrawal length from the bedrunner 7(d), a bridge stop nut 29 (ref. FIG. 8, FIG. 11A) affixed to the interior of the bedrunner 7(d), prevented further extraction of the bridge 8(d). Once the bridge 8(d) has been extended its full length, the bridge 8(d) covers the horizontal length of the tailgate 5 of the truck 6 and serves to prevent undue contact with or damage to the tailgate 5. Likewise, by individually grasping the recessed openings 21 of the remaining ramps 9(a), 9(b), 9(c), the remaining three ramps 9(b), 9(c), 9(d), may also be extended.

Figure 2:
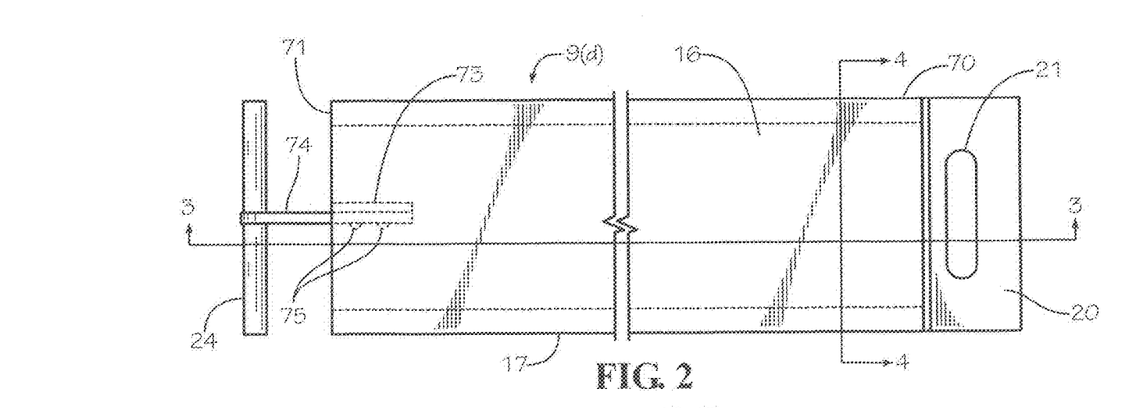
FIG. 2 depicts a standalone plan view of one of the ramps, 9(*a*), including its hinge pivot bar 24, bar connector 74, and pull-out handle 20.

In viewing FIG. 2, a more detailed depiction of the structure and mechanism associated with a typical ramp 9(d) is shown. By way of illustration only, the rightmost ramp 9(d) of FIG. 1 is shown and depicted by means of its plan view. In FIG. 2, the ramp 9(d) hinge end 71 is the general location of vertical attachment of a support beam 73 between the interior of the top surface 16 and the interior bottom surface 19. A bracket 74 is attached to the support beam 73 by means of bolts 75. A horizontally-oriented hinge pivot bar 24 is then securely affixed to the bracket 74 (also shown in FIG. 3). The ramp front end 70 is the point of attachment of a handle 20 having a recessed opening 21 for ease of grasping.

Figure 3:
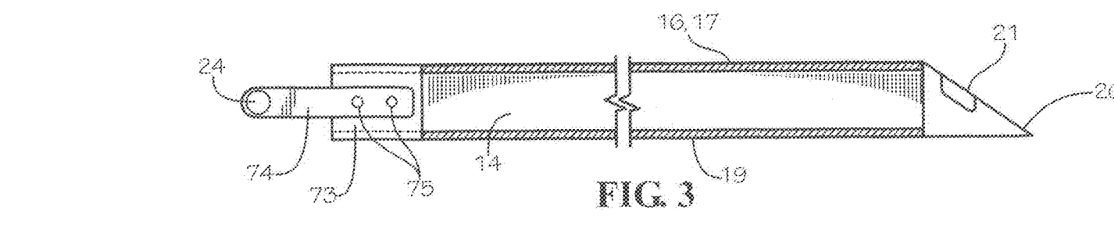
FIG. 3 shows a segmented section view of the ramp 9(*d*) in accordance with the view produced by section line 3-3 of FIG. 2.

FIG. 3 is a section view of the left side of the ramp 9(d), as displayed with respect to section line 3-3 of FIG. 2. Again, shown in FIG. 3 is the support bean 73 attached to the interior surfaces of the ramp top 16 and ramp bottom 19 of the ramp 9(d). Further, the bracket 74 is shown attached by bolts 75. The hinge pivot bar 24 is orthogonally welded to the rear end of the bracket 74. The two bolts 75 may be loosened and thereby allow the slidable positioning of the bracket 74 horizontally, if necessary. The variable positioning of the bracket 74 permits the deployment of the ramp 10 at a variety of downward angles for cargo loading and further helps the ramp 9(d) in clearing the tailgate 5 of a truck, if present.

The function and structure of the ramp 9(d) shown in FIG. 2 and FIG. 3 is identical to that of the remaining ramps 9(a), 9(b), 9(c), which are shown retracted and stowed in FIG. 1.

Figure 4:
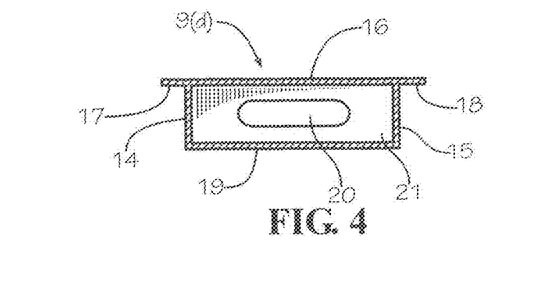
FIG. 4 presents a front section view of one of the ramps 9(*a*) in accordance with the view resulting from section line 4-4 of FIG. 2.

FIG. 4 depicts a cross-sectional view of the front portion of the ramp 9(d), in accordance with the orientation of section line 4-4 of FIG. 2. An upper left flange 17 and an upper right flange 18 are shown, both of which help impart rigidity to the ramp 9(d). Both flanges 17, 18 extend the entire length of the ramp 9(d), while the right flange 18 provides vertical clearance over a rod guide tube 27 attached to the right sidewall of the corresponding bridge 8(d). The rod guide tube 27 is illustrated more clearly in FIG. 5 and FIG. 6. The top surface 16 of the ramp 9(d) shown in FIG. 2 may be fabricated with a non-slip coating for footing safety and better traction for wheeled cargo items.

Figure 7:
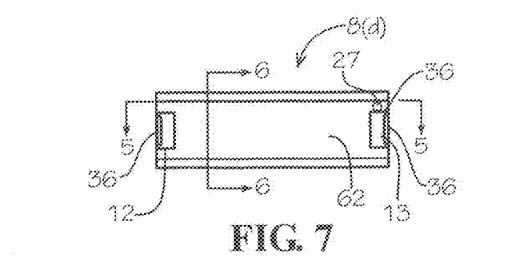
FIG. 7 depicts a from view of the full bridge 8(*d*), further showing the left stop block 12 and right stop block 13, and the rod guide tube 27.

For convenience of the sequence of description, the front end 62 of the rightmost bridge 8(d) of FIG. 1 is discussed as shown in FIG. 7. The function and structure of this bridge 8(d) is identical to that of the remaining bridges 8(a), 8(b), 8(c) which are out of view, but housed within the confines of bedrunners 7(a), 7(b), 7(c) of FIG. 1. The front end 62 of the bridge 8(d) is hollow as to allow horizontal passage of its corresponding ramp 9(d) horizontally back-and-forth during normal operation of the ramp loading system 1. Also shown in FIG. 7 is the rod guide tube 27 as it is welded 36 to the right wall of the bridge 8(d), the left stop block 12, and right stop block 13.

Figure 5:
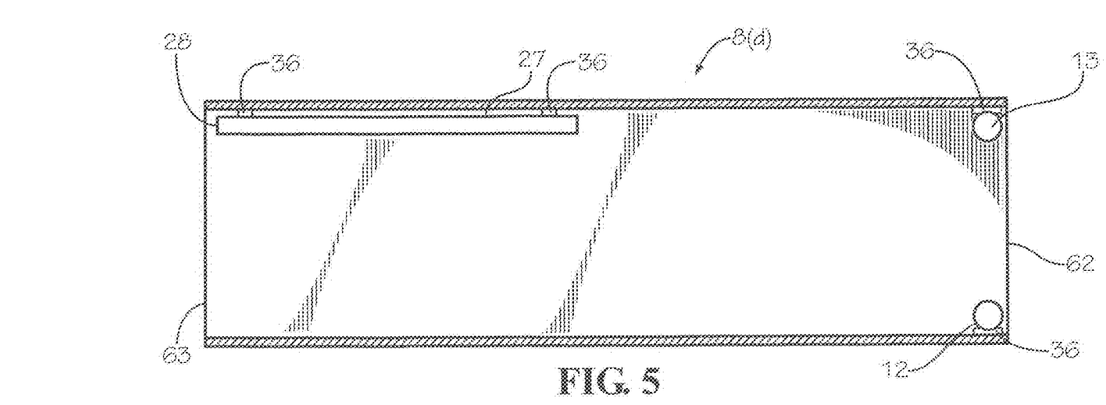
FIG. 5 presents a plan view of a bridge 8(*d*) in accordance with the section line 5-5 of FIG. 7.

Moving next to FIG. 5, there is illustrated a sectional plan view of the bridge 8(d) in accordance with section line 5-5 of FIG. 7. Toward the front end 62 of the bridge 8(d), are shown the left and right stop blocks 12, 13 which serve to engage the hinge pivot bar 24 at the front end 70 of the corresponding ramp 9(d) during horizontal travel back and forth. The left and right stop blocks 12, 13 are welded 36 to the interior sides of the bridge 8(d), as shown in FIG. 5. The rod guide tube 27 is also shown with a plurality of welds 36 attaching it to the right side wall of the ramp 8(d). The rod guide tube 27 has a cap 28 which engages a bridge stop nut 29 (shown in FIG. 8 and FIG. 9), which stop nut 29 is affixed to the travel rod 25 of the associated bedrunner 7(*d*).

Figure 6:
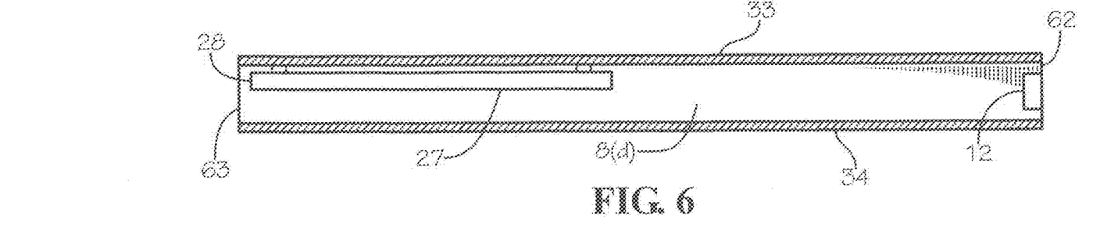
FIG. 6 illustrates a side section view of the bridge 8(*d*) of FIG. 5 as depicted resulting from section line 6-6 or FIG. 7.

FIG. 6 depicts a sectional view of the left side of bridge 8(*d*) in accordance with section line 6-6 of FIG. 7. Toward the front end 62 of the bridge 8(*d*) is shown the left stop block 12. The rod guide tube 27 is also shown along with the guide tube cap 28. Again, for reference purposes, it is noted that the front end 62 of the rightmost bridge 8(*d*) of FIG. 1 is depicted in FIG. 7. The function and structure of this bridge 8(*d*) is identical to that of the remaining bridges 8(*a*), 8(*b*), 8(*c*) which are out of view, but housed within the confines of bedrunners 7(*a*), 7(*b*), 7(*c*) illustrated in FIG. 1. Also shown in FIG. 7 is the rod guide tube 27 as it is welded 36 to the right wall of the bridge 8(*d*), the left stop block 12, and right stop block 13.

The from end 62 of the bridge 8(*d*) is open so as to allow horizontal passage of its corresponding ramp 9(*d*) to and fro during normal operation of the ramp loading system 1. The interior dimensions and contour of the bridge 8(*d*) are accurately designed and fabricated to accommodate passage and nestling of the exterior dimensions and contour of its associated ramp 9(*d*). The function and structure of this bridge 8(*d*) are identical to that of the remaining bridges 8(*a*), 8(*b*), 8(*c*) (which are not in view in FIG. 1).

Figure 10:
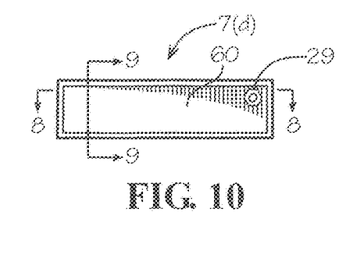
FIG. 10 is a frontal view of the bedrunner 7(*d*) of FIG. 8.

Turning now to FIG. 8, there is illustrated a sectional plan view of the bedrunner 7(*d*) which structurally corresponds to the previously-described bridge 8(*d*). To facilitate ease of description, the front end 60 of the rightmost bedrunner 7(*d*) of FIG. 1, as depicted in FIG. 10 is discussed. Thus, FIG. 8 is shown in accordance with section lines 8-8 of FIG. 10. The front end 60 of the bedrunner 7(*d*) is open so as to allow horizontal passage of its corresponding bridge 8(*d*) back and forth during normal operation of the ramp loading system 1. Also shown in FIG. 8 is the travel rod 25, and its corresponding bridge stop nut 29, the rear portion of the travel rod 25 being welded 36 to the right wall of the bedrunner 7(*d*).

Figure 9:
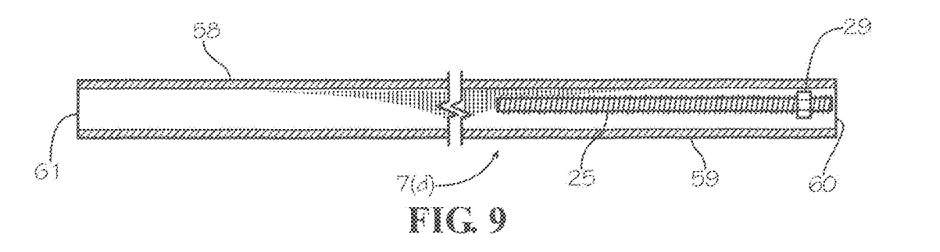
FIG. 9 is a sidewise section view of the bedrunner 7(*d*) of FIG. 8, as revealed by section line 9-9 of FIG. 10, and further showing the travel rod 25.

FIG. 9 illustrates a sectional view of the left side of the bedrunner 7(*d*) in accordance with section line 9-9 of FIG. 10. The bedrunner 7(*d*) may be secured to the bed of a pickup truck or other surface by attachment at the undersurface 59 of the bedrunner 7(*d*) or at the back end 61 of the bedrunner 7(*d*).

The function and structure of the bedrunner 7(*d*) under discussion is identical to that of the remaining bedrunners 7(*a*), 7(*b*), 7(*c*) which are depicted in the preferred embodiment of FIG. 1. The interior dimensions and contour of the bedrunner 7(*d*) are accurately designed and fabricated to accommodate through-passage and nestling of the exterior dimensions and contour of its associated bridge 8(*d*).

Figure 11:
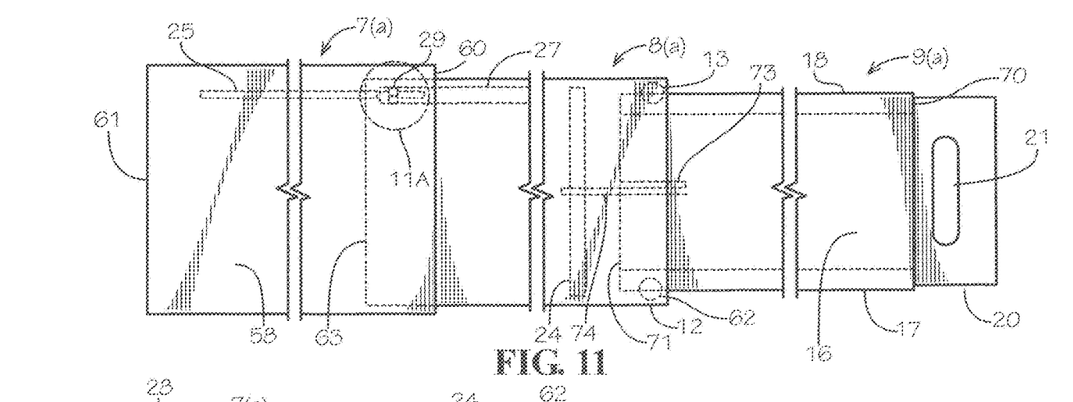
FIG. 11 presents a plan view of a lengthwise segment of the ramp loading system 1 displaying the connecting pattern of nestling comprising a bedrunner 7(*a*), a bridge 8(*a*), and a partially extended ramp 9(*a*).
Figures 11A, 12:
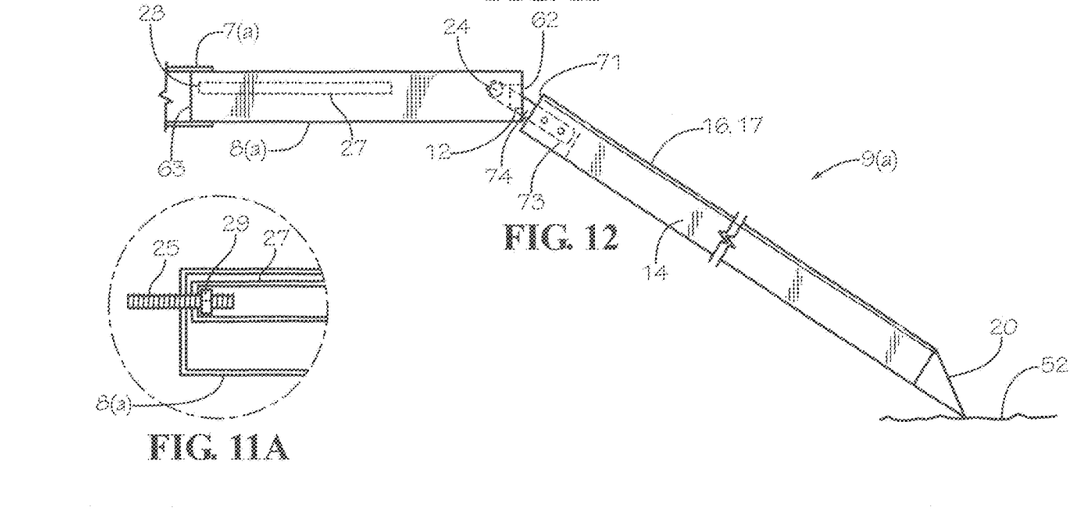
FIG. 11(A) depicts an expanded view of the end of the imbedded bridge 8(*a*) as the rod guide tube 27 engages the stop nut 29 of the travel rod 25.
FIG. 12 is the side view of a ramp 9(*a*) having been extended and rotated downward in preparation for loading or unloading cargo; the bridge 8(*a*) remains horizontal, with the ramp hinge pivot bar 24 pivot pin abutting the ramp stop blocks, 12, 13 which serve to limit ramp 9(*a*) travel extension.

As an overall illustration of the interrelationship of the structure of the ramp loading system 1, FIG. 11 depicts the relative extension-retraction operation of the leftmost ramp 9(*a*), its bridge 8(*a*), and the bedrunner 7(*a*). Analyzing FIG. 11 from the operation of extending the ramp 9(*a*) for loading or unloading cargo, a user initiates the procedure by grasping the recessed opening 21 of the ramp handle 20 and pulling horizontally outward.

The ramp 9(*a*) moves outward from its stowage inside the bridge 8(*a*) and eventually the hinge pivot bar 24 makes contact with the vertically-oriented left and right stop blocks 12, 13 attached to the interior walls of the bridge 8(*a*). This contact causes the bridge 8(*a*) to be extracted from its nestling position inside the bedrunner 7(*a*). These three segments of the ramp loading system 1 respectively depict the telescopic manner of nestling, with sufficient lateral and longitudinal clearance, of the bedrunner 7(*a*), bridge 8(*a*), and ramp 9(*a*), from left to right.

FIG. 11A is a close-up view of the manner in which the end cap 28 of the rod guide tube 27 of the bridge 8(*a*) engages the bridge stop nut 29. The bridge stop not 29 is coupled with the threaded travel rod 25. As the end cap 28 of the rod guide tube 27 contacts the bridge stop nut 29, the bridge 8(*a*) is prevented from any further lengthwise extraction from the bedrunner 7(*a*).

FIG. 12 shows the stage wherein the ramp 9(*a*) has been pulled from the bridge 8(*a*) to the limit of its travel from without the bedrunner 7(*a*). Also, the hinge pivot bar 24 is shown abutting the left and right stop blocks 12, 13. At this point, a user lowers the ramp 9(*a*) and this action causes the hinge pivot bar 24 to move slightly upward, rotating the back end 71 of the ramp. The hinge pivot bar 24 then is stabilized in position against the stop blocks 12, 13. In turn, the handle 20 of the ramp 9(*a*) makes contact with the ground 52 or other surface. After the loading operation is complete, the user grasps the handle 20, pulls the ramp 9(*a*) upward to a horizontal orientation, then pushes the ramp 9(*a*), into the back end 63 of the bridge 8(*a*). Continuation of the pushing motion causes both the bridge 8(*a*) and ramp 9(*a*) to retract into the bedrunner 7(*a*).

While preferred embodiments of the present inventive concept have been shown and disclosed herein, it will be obvious to those persons skilled in the art that such embodiments are presented by way of example only and not as a limitation to the scope of the inventive concept. Numerous variations, changes, and substitutions may occur or be suggested to those skilled in the art without departing from the intent, scope, and totality of the inventive concept. Such variations, changes, and substitutions may involve other features which are already known per se and which may be used instead of, or in addition to features already disclosed herein. Accordingly, it is intended that this inventive concept is limited only by the scope of the accompanying claims.

What is claimed is:

1. A device for loading and unloading cargo, wheeled vehicles, and equipment onto or from the bed or cargo floor of a vehicle, the device comprising a ramp loading system having at least one bedrunner, at least one bridge, and at least one ramp, further comprising:

the at least one bedrunner, further comprising a rectangular, oblong box having an open front end, with a length-wise threaded guide rod affixed interiorly therein for retention of a stop nut on said guide rod and the bedrunner being affixed to the bed or floor of the vehicle;

the at least one bridge further comprising a rectangular box structure having a top surface, a bottom surface, a left wall, a right wall, a rear wall, and an open front end, with the exterior dimensions and contour corresponding to the interior of the bedrunner, further having left and right stop blocks vertically affixed to the front inner left and front inner right walls respectively, and a guide tube having a capped rear end is affixed to one wall of the bridge, and;

the at least one ramp further comprising a rectangular box having a left flange and a right flange, having exterior dimensions and contour corresponding to the interior of the bridge, further comprising a front end and a hinge end, the hinge end having a bracket affixed thereto, whereby a hinge pivot bar is welded to the bracket.

2. A device as in claim 1 wherein (a) the ramp slides horizontally and telescopically within the bridge and may be extended downward by rotation of the hinge pivot bar when being in abutment to the left and right stop blocks, (b) the bridge slides horizontally and telescopically within the bedrunner and is prevented from exiting the bedrunner by the capped end of the guide tube engaging the stop nut and (c) the ramp and bridge may be fully nestled within the confines of the bedrunner when the device is not in use.

3. A device as in claim 1, further comprising a plurality of bedrunners, affixed side-by-side in a parallel manner onto the bed or floor of the vehicle, a matching plurality of corresponding bridges encompassed within the bedrunners, and a matching plurality of corresponding ramps encompassed within the bridges.

4. A device as in claim 1, wherein the vehicle comprises a pickup truck.

5. A device as in claim 1 wherein the vehicle comprises a trailer of the type which may be attached to, and pulled by, a motorized tractor or truck cab.

6. A device as in claim 1 wherein the respective top surfaces of the bedrunner, bridge, and ramp are permanently coated with a material comprising a non-slip substance.

7. A system for loading and unloading cargo, wheeled vehicles, and equipment onto or from the bed or cargo floor of a vehicle or of a loading ramp, the system comprising a ramp loading apparatus having four parallel mechanisms, each mechanism comprising a bedrunner telescopically enclosing a correspondingly contoured bridge, and the bridge telescopically enclosing a correspondingly contoured ramp, further comprising:

each bedrunner comprising a rectangular, oblong box having an open front end, with a length-wise guide rod welded interiorly therein for retention of a stop nut on said guide rod and the bedrunner being permanently affixed to the bed or floor of said truck;

each bridge further comprising a rectangular box structure having a top surface, a bottom surface, a left wall, a right wall, a rear wall, and an open front end, with the exterior dimensions and contour corresponding to the interior of the bedrunner, further having left and right stop blocks welded to the front inner left and front inner right walls, and a guide tube having a capped rear end is affixed to one wall of the bridge;

the at least one ramp further comprising a rectangular box having a left flange and a right flange, and further having exterior dimensions and contour corresponding to the interior of the bridge, further comprising a front end and a hinge end, the hinge end having a bracket affixed thereto, whereby a hinge pivot bar is welded to said bracket.

8. A system as in claim 7 wherein (a) the ramp slides horizontally and telescopically within the bridge and may be extended downward by rotation of the hinge pivot bar when the ramp is pulled outward and engages in abutment to the left and right stop blocks, (b) the bridge slides horizontally and telescopically within the bedrunner and is prevented from exiting the bedrunner by the capped end of the guide tube engaging the stop nut and (c) the ramp and bridge may be fully nestled within the confines of the bedrunner when the system is not in use.

9. A system as in claim 7, wherein the vehicle comprises a pickup truck.

10. A system as in claim 7 wherein the vehicle comprises a trailer of the type which may be attached to, and pulled by, a motorized tractor or truck cab.

11. A system as in claim 7, wherein the respective top surfaces of the bedrunner, bridge, and ramp are permanently coated with a material comprising a non-slip substance.

12. A system for loading and unloading cargo, wheeled vehicles, and other equipment into or from an edifice such as a dock, wharf, loading ramp, or other fixed structure, the system comprising an apparatus having four parallel mechanisms, with each mechanism comprising an oblong, rectangular cross-sectioned hollow box telescopically enclosing a correspondingly contoured bridge, and the bridge telescopically enclosing a compatibly contoured ramp, further comprising:

each oblong, rectangular cross-sectioned hollow box having an open front end, with a length-wise guide rod welded interiorly therein for retention of a stop nut on said guide rod and the oblong, rectangular cross-sectioned hollow box being permanently affixed to the floor of the edifice;

each bridge constructed s a rectangular box structure having a top surface, a bottom surface, a left wall, a right wall, a rear wall, and an open front end, with the exterior dimensions and contour corresponding to the interior of the oblong, rectangular cross-sectioned hollow box further having left and right stop blocks welded to the front inner left and front inner right walls, and a guide tube having a capped rear end is affixed to one wall of the bridge;

each ramp further constructed as a rectangular box having a left flange and a right flange, and further having exterior dimensions and contour corresponding to the interior of the bridge, further comprising a front end and a hinge end, the hinge end having a bracket affixed thereto, whereby a hinge pivot bar is welded to said bracket.

13. A system as in claim 12 wherein (a) the ramp slides horizontally and telescopically within the bridge and may be extended downward by rotation of the hinge pivot bar when being in abutment to the left and right stop blocks, (b) the bridge slides horizontally and telescopically within the oblong, rectangular cross-sectioned hollow box, and is prevented from exiting the oblong, rectangular cross-sectioned hollow box by the capped end of the guide tube engaging the stop nut and (c) the ramp may be fully nestled within the bridge and simultaneously, the bridge may be fully nestled within the confines of the oblong, rectangular cross-sectioned hollow box when the system is not in use.

14. A system as in claim 12, wherein the respective top surfaces of the oblong, rectangular cross-sectioned hollow box, bridge, and ramp are permanently coated with a material comprising a non-slip substance.

* * * * *